United States Patent
Bick et al.

(10) Patent No.: US 9,740,213 B2
(45) Date of Patent: Aug. 22, 2017

(54) VEHICLE COMBINATION AND METHOD FOR FORMING AND OPERATING A VEHICLE COMBINATION

(71) Applicant: KUKA Roboter GmbH, Augsburg (DE)

(72) Inventors: Christoph Bick, Augsburg (DE); Daniel Meyer-Delius, Munich (DE); Jeremie Tardivon, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 15/057,511

(22) Filed: Mar. 1, 2016

(65) Prior Publication Data

US 2016/0274591 A1 Sep. 22, 2016

(30) Foreign Application Priority Data

Mar. 19, 2015 (DE) .................. 10 2015 205 032

(51) Int. Cl.
| | |
|---|---|
| G05D 1/00 | (2006.01) |
| G05D 1/02 | (2006.01) |
| B62D 59/04 | (2006.01) |

(52) U.S. Cl.
CPC .......... *G05D 1/0295* (2013.01); *B62D 59/04* (2013.01); *G05D 1/0027* (2013.01); *G05D 2201/02* (2013.01)

(58) Field of Classification Search
None
See application file for complete search history.

(56) References Cited

U.S. PATENT DOCUMENTS

| | | | |
|---|---|---|---|
| 2010/0044998 A1* | 2/2010 | Franchineau ............ | B60D 1/36 280/491.1 |
| 2013/0213518 A1* | 8/2013 | Bonefas ............... | A01D 43/073 141/1 |

FOREIGN PATENT DOCUMENTS

| | | |
|---|---|---|
| DE | 202012002846 U1 | 7/2012 |
| EP | 1 957 348 B1 | 9/2010 |
| EP | 2402924 A1 | 1/2012 |
| JP | 2014-182536 A | 9/2014 |

OTHER PUBLICATIONS

European Patent Office; Search Report in European Patent No. 16159680.4 dated Oct. 5, 2016; 6 pages.
German Patent Office; Office Action in German Patent No. 102015205032.7 dated Dec. 11, 2015; 6 pages.

* cited by examiner

*Primary Examiner* — Angela Ortiz
*Assistant Examiner* — Garret Evans
(74) *Attorney, Agent, or Firm* — Wood Herron & Evans LLP

(57) ABSTRACT

A vehicle combination and a method for forming and operating a vehicle combination that includes at least first and second autonomous vehicles. Each of the autonomous vehicles is configured to automatically control its motions in a state wherein the first and second autonomous vehicles do not form the vehicle combination. When the vehicle combination is formed, the two autonomous vehicles are connected via a communications connection and the first autonomous vehicle automatically controls the motion of the second autonomous vehicle via the communication connection.

16 Claims, 1 Drawing Sheet

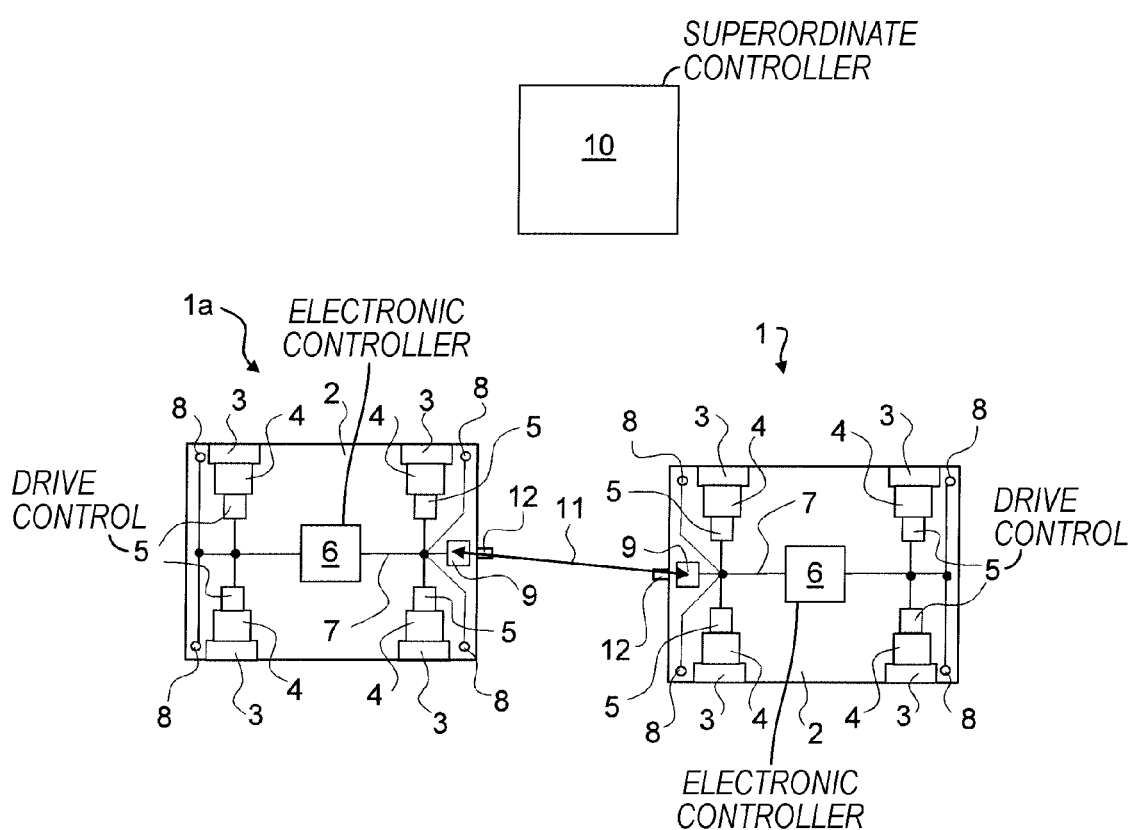

VEHICLE COMBINATION AND METHOD FOR FORMING AND OPERATING A VEHICLE COMBINATION

CROSS-REFERENCE TO RELATED APPLICATIONS

This application claims the benefit of priority under 35 U.S.C. §119(a) to German Patent Application DE 10 2015 205 032.7, filed Mar. 19, 2015 (pending), the disclosure of which is hereby incorporated by reference in its entirety.

TECHNICAL FIELD

The invention relates to a method for forming and operating a vehicle combination, comprising several autonomous vehicles. The invention additionally relates to a respective vehicle combination.

BACKGROUND

An autonomous vehicle is for example an Automated Guided Vehicle (AGV). An automated guided vehicle is a ground transportation means with an independent drive, which is automatically steered and guided in a touchless fashion.

EP 1 957 348 B1 discloses a vehicle combination comprising several individual vehicles. The individual vehicles respectively comprise a body, at which coupling devices are formed, which allow a form-fitting coupling of two individual vehicles to each other, and an individual steering. The mechanic coupling prevents any relative motion of the individual vehicles in reference to each other within the driving level. Within the vehicle combination, the individual controls are inactive and the wheel drives of the individual vehicles are selectively addressed via a superimposed combination control.

The objective of the invention is to provide an improved method for forming and operating a vehicle combination comprising autonomous vehicles, in particular automatic guided transportation vehicles.

SUMMARY

The objective of the invention is attained in a method for forming and operating a vehicle combination, which comprises at least a first autonomous vehicle and a second autonomous vehicle, with each autonomous vehicle being embodied to automatically control its motion in the state in which the autonomous vehicles are not part of a vehicle combination, showing the following processing steps:
  a) automatic generation of a communication connection between the first autonomous vehicle and the second autonomous vehicle, and
  b) automatic control of the motion of the second autonomous vehicle by the first autonomous vehicle via the communication connection, in order to form a vehicle combination from the first autonomous vehicle and the second autonomous vehicle.

Another aspect of the invention relates to a vehicle combination, comprising at least a first autonomous vehicle and a second autonomous vehicle, respectively embodied to automatically control their own motions in the state in which the autonomous vehicles do not form a vehicle combination, and during the vehicle combination the two autonomous vehicles are connected via a communication connection and the first autonomous vehicle automatically controls via the communication connection the motion of the second autonomous vehicle.

With the method according to the invention the vehicle combination according to the invention can be formed.

The first autonomous vehicle is preferably a first automated guided vehicle and the second autonomous vehicle is preferably a second automated guided vehicle.

The vehicle combination comprises at least two autonomous vehicles. When the autonomous vehicles are not connected to a vehicle combination, then each of the autonomous vehicles is embodied to automatically control its own motions. However, in the vehicle combination the autonomous vehicles are connected via the communication connection. This represents in particular a wireless communication connection. For this purpose, the autonomous vehicles include suitable transceivers, for example. Preferably, each of the autonomous vehicles comprises a photoelectric relay by which the communication connection is established or generated, in particular in a wireless fashion. The communication connection is in particular a bidirectional communication connection.

The autonomous vehicles can communicate via the communication connection and this way form the vehicle combination according to the invention, in which the first autonomous vehicle automatically controls the second autonomous vehicle and/or its motion. This way, the vehicle combination appears like an individual vehicle.

According to a preferred embodiment each of the autonomous vehicles comprises a separate bus system, wheels for moving the respective autonomous vehicle, drive devices for driving the wheels, sensors, and an electronic control device, which can communicate via the bus system of the respective autonomous vehicle with the sensors and the drive devices of the respective autonomous vehicle in order to automatically move the autonomous vehicle by an automatic controlling of the drive devices of the respective autonomous vehicle in the state in which the autonomous vehicle is not forming a vehicle combination. Each of the autonomous vehicles comprises therefore its own electronic control device and its own bus system, by which the electronic control device can control the drive devices of the respective autonomous vehicle. This way, each of the autonomous vehicles can move, automatically controlled by its own electronic control device, when the autonomous vehicles are not combined to a vehicle combination. The drive device comprises, e.g., respectively a drive, preferably an electric drive, provided for driving a wheel, and a drive control device for controlling said drive. The drive control device is connected via the bus system to the respective electronic control device.

The sensors in particular represent laser scanners, which are provided to scan the environment of the autonomous vehicle. The data of the sensors and/or laser scanners can be transmitted to the respective electronic control device, so that it can evaluate said data.

The autonomous vehicles are preferably holonomic and/or omnidirectional autonomous vehicles, preferably holonomic and/or omnidirectional automated guided vehicles. In this case, each of the autonomous vehicles comprises omnidirectional wheels, preferably so-called mecanum-wheels, with their drive being controlled by the electronic control devices.

According to a variant of the method according to the invention it may comprise an automatic generation of the communication connection between the bus system of the first autonomous vehicle and the bus system of the second autonomous vehicle in order to form a common bus system. This way, during the (operation as a) vehicle combination the two bus systems can form a common bus system via the communication connection.

Preferably the method according to the invention comprises an automatic control of the drive devices of the second autonomous vehicle by the electronic control device of the first autonomous vehicle over the common bus system, in order to form the vehicle combination from the first autonomous vehicle and the second autonomous vehicle.

According to this variant a method develops for forming and operating a vehicle combination, which comprises at least a first autonomous vehicle and a second autonomous vehicle, with each of the autonomous vehicles being embodied to automatically control its motion, in the state in which the autonomous vehicles are not forming a vehicle combination, and each of the autonomous vehicles comprising a separate bus system, wheels for moving the respective autonomous vehicle, drive devices for driving the wheels, sensors, and an electronic control device, with the control device being embodied to communicate via the bus system of the respective autonomous vehicle with the sensors and the drive devices of the respective autonomous vehicle in order to automatically move the respective autonomous vehicle in the state in which the autonomous vehicles are not forming a vehicle combination by an automatic control of the drive devices, showing the following processing steps:

a) automatic generation of a communication connection between the bus system of the first autonomous vehicle and the bus system of the second autonomous vehicle in order to form a common bus system, and b) automatic control of the drive devices of the second transportation vehicle by the electronic control device of the first autonomous vehicle via the common bus system in order to form the vehicle combination from the first autonomous vehicle and the second autonomous vehicle.

Preferably here, in case of a vehicle combination according to the invention, the electronic control device of the first autonomous vehicle directly controls via the common bus system the drive devices of the second autonomous vehicle in order to form a vehicle combination from the first autonomous vehicle and the second autonomous vehicle.

Due to the common bus system, here the electronic control device of the first autonomous vehicle can communicate directly with the sensors and the drive devices of the second autonomous vehicle, thus circumventing the electronic control device of the second autonomous vehicle, in order to move it automatically.

Before step a), e.g., the following actions can be performed:

Detecting characteristic features of the second vehicle via the first autonomous vehicle and detecting the relative pose (e.g., position and orientation) between the two autonomous vehicles by the first autonomous vehicle and automatically moving the first autonomous vehicle, in particular controlled by its electronic control device so that the two autonomous vehicles show a predetermined pose in reference to each other, or Detecting characteristic features of the first autonomous vehicle via the second autonomous vehicle and determining the relative pose between the two autonomous vehicles by the second autonomous vehicle and automatically moving the second autonomous vehicle, in particular controlled by its electronic control device such that both autonomous vehicles show a predetermined pose in reference to each other.

This way it can be provided that, e.g. starting at an arbitrary pose, i.e. position and orientation, of one of the two autonomous vehicles via its sensors characteristic features of the other autonomous vehicle are detected. Based on these features it is possible for this autonomous vehicle to calculate with its electronic control device the relative pose and/or position of the two autonomous vehicles. The characteristic features are calculated for example from a geometric model of the other autonomous vehicle. The model is saved, e.g. in the electronic control device of the respective autonomous vehicle.

Subsequently one of the two autonomous vehicles can drive, automatically controlled by its electronic control device and preferably regulated, to a predetermined docking pose and/or docking position and orientation in reference to the other autonomous vehicle. For example, based on data of the sensors of the automatically moving autonomous vehicle and odometer data this autonomous vehicle can automatically monitor the relative pose and/or position in reference to the other autonomous vehicle during its automatic motion. The automatic monitoring of the relative pose occurs for example based on a particle filter-based method known in principle to one trained in the art.

When both autonomous vehicles have approached sufficiently the communication connection can be automatically generated.

The two autonomous vehicles can each show a mechanic coupling device. Then it may be provided that the two autonomous vehicles are coupled automatically via the mechanic coupling devices, in particular controlled by the electronic control device of the first autonomous vehicle via the common bus system.

Preferably the two autonomous vehicles each show a navigation functionality. This includes information in particular regarding the configuration of the respective autonomous vehicle. Based on this navigation functionality, in the state in which the autonomous vehicles are not forming a vehicle combination, the electric control device can automatically move the corresponding autonomous vehicle. The information regarding the configuration of the respective autonomous vehicle comprises, e.g., a model of the respective autonomous vehicle. This model is saved e.g., in the respective electronic control device. The model comprises e.g., a statement regarding the contour, the rotation center, kinetic-dynamic parameters (maximum speed, acceleration, etc.), the number, position, and connection data of the sensors of the respective autonomous vehicle.

According to a variant of the method according to the invention an automatic reconfiguring of the navigation functionality of the first autonomous vehicle is provided such that it includes information regarding the configuration of the vehicle combination. The information regarding the configuration of the vehicle combination may comprise e.g., a model of the vehicle combination. This model comprises, e.g., a statement regarding the contour, the rotation center, the kinetic-dynamic parameters (maximum speed, acceleration, etc.), the number, position, and connection data of the sensors of the vehicle combination.

An automatic dissolution of the vehicle combination may be provided as well. For this purpose, the following steps can be performed:

If the automatic vehicles are mechanically coupled, mechanic decoupling occurs. This is preferably controlled automatically by the first autonomous vehicle. The coupling devices of both autonomous vehicles are preferably opened jointly.

Then the vehicle roles change: The role of the two autonomous vehicles is set to individual vehicle, i.e. the first autonomous vehicle only controls automatically its own motion and the second vehicle controls its own motion independently. The communication connection is severed.

The configuration of the navigation functionality of the first autonomous vehicle is reset to the original configuration.

Subsequently a controlled separation can occur of the two autonomous vehicles.

A fleet management may occur. The autonomous vehicles in the vehicle combination communicate their roles and the identity to the other autonomous vehicles in the formation. Based on this information, a superordinate process control can directly address and command the autonomous vehicle which is controlling the vehicle combination, i.e. the first autonomous vehicle. All autonomous vehicles in the vehicle combination can therefore be commanded by a single autonomous vehicle.

The vehicle combination may also show more than two autonomous vehicles. A vehicle combination with e.g., three autonomous vehicles may be generated from a vehicle combination with two autonomous vehicles and another autonomous vehicle.

Based on the method according to the invention it is possible to combine several autonomous vehicles in a fully automatic operation in order to form a vehicle combination, then to command said combination, and perhaps to dissolve this vehicle combination that has formed at a later time. In particular it may be provided to switch the drive control systems distributed over several autonomous vehicles of the vehicle combination to a common control system, reconfigure the autonomous navigation software online, in order to allow illustrating the altered vehicle features of the vehicle combination, and to include the sensors of all autonomous vehicles included in the vehicle combination in the navigation, according to an also provided mechanic formation key generated.

BRIEF DESCRIPTION OF THE DRAWINGS

An exemplary embodiment of the invention is shown in the attached schematic FIGURE, which illustrates several automated guided vehicles forming a vehicle combination.

The FIGURE shows a first automated guided vehicle 1 and a second automated guided vehicle 1*a*.

DETAILED DESCRIPTION

In the case of the present exemplary embodiment, each of the automated guided vehicles 1, 1*a* comprises a vehicle body 2, several wheels 3, which are fastened at the vehicle body 2 via suspensions, not shown in greater detail, and several electric drives 4. One of the electric drives 4 is allocated to each of the wheels 3 such that during operation of the automated guided vehicles 1, 1*a* the electric drives 4 can drive their wheels 3.

Furthermore, in the case of the present exemplary embodiment, each of the automated guided vehicles 1, 1*a* comprises drive control devices 5, which are provided to control the electric drives 4 such that the respective wheels 3 e.g., show a predetermined speed or operate with a predetermined electric power in order to generate a certain torque.

The automated guided vehicles 1, 1*a* further include an electronic control device 6 each, which is embodied such that it can move the respective automated guided vehicle 1, 1*a* automatically. The electronic control devices 6 are in particular embodied such that they can control the respective drive control devices 5 such that the respective automated guided vehicle 1, 1*a* moves automatically as desired. In order to allow for the electronic control devices 6 to communicate with the drive control devices 5 of the respective automated guided vehicle 1, 1*a*, each of the automated guided vehicles 1, 1*a* comprises a respective bus system 7, e.g.

The automated guided vehicles 1, 1*a* each comprise several sensors 8, which are connected e.g., via the respective bus system 7 to the respective electronic control device 6. The sensors 8 represent in particular laser scanners, with the help of which the respective automated guided vehicle 1, 1*a* can scan the environment. In the electronic control devices 6, e.g., respective electronic maps of the environment are saved, so that the automated guided vehicles 1, 1*a* and/or their electronic control devices 6 can determine their poses by evaluating data from the sensors 8 and the digital maps, i.e. their positions and orientations within the environment.

The automated guided vehicles 1, 1*a* are preferably embodied as omnidirectional mobile and/or holonomic automated guided vehicles. The wheels 3 are preferably omnidirectional wheels, which are also called mecanum wheels. Such wheels include for example a rotationally supported rim, at which several roller bodies are supported without being driven. The rims are driven in particular with the electric drives 5.

In case of the present exemplary embodiment, a superordinate process control 10 is provided, which can communicate, in particular wirelessly, with the automated guided vehicles 1, 1*a*.

In case of the present exemplary embodiment the automated guided vehicles 1, 1*a* each show a wireless transceiver, which is preferably embodied as a photoelectric relay 9. The photoelectric relay 9 of the first automated guided vehicle 1 is connected via its bus system 7 and the photoelectric relay 9 of the second automated guided vehicle 1*a* is connected via its bus system 7.

In case of the present exemplary embodiment the two automated guided vehicles 1, 1*a* are embodied such that they can automatically connect their bus systems 7 via the wireless transceivers, thus in case of the present exemplary embodiment via their photoelectric relays 9. This way, a bidirectional communication connection 11 develops between the two transceivers embodied as photoelectric relays 9, resulting in a common bus system comprising the two individual bus systems 7 of the two automated guided vehicles 1, 1*a*. This way it is possible, e.g., that the two electronic control devices 6 can communicate with each other.

In case of the present exemplary embodiment it is provided that after the communication connection 11 has been automatically generated between the two transceivers embodied as photoelectric relays 9, a vehicle combination and/or vehicle formation develops from the two automated guided vehicles 1, 1*a* in which one of the two automated guided vehicles, for example the first automated guided vehicle 1, automatically controls the motion of the other automated guided vehicle, e.g., the motion of the second automated guided vehicle 1*a*. Therefore, in particular a common drive control is achieved of both automated guided vehicles 1, 1*a* by one of the two automated guided vehicles 1, 1*a*.

In case of the present exemplary embodiment it is provided that the first automated guided vehicle controlling the motion of the two automated guided vehicles 1, 1a communicates also via its electronic control device 6 with the drive control devices 5 and the sensors 8 of the other automated guided vehicle 1a via the bus systems 7 and the communication connection 11, thus via the common bus system, in order to directly control the motion of the other automated guided vehicle 1a, thus circumventing the electronic control device 6 of the other automated guided vehicle 1a.

In case of the present exemplary embodiment it may also be provided that the two automated guided vehicles 1, 1a are mechanically coupled for the vehicle combination. For this purpose, the two automated guided vehicles 1, 1a may each comprise a mechanical coupling device 12, which allows an automatic mechanic coupling of the two automated guided vehicles 1, 1a.

In case of the present exemplary embodiment the automatic generation of the vehicle combination and/or the vehicle formation occurs as follows:

Starting from an arbitrary pose and/or position (the approaching pose) of one of the two automated guided vehicles, e.g., the first automated guided vehicle 1, it searches via sensors 8 for characteristic features of the second automated guided vehicle 1a. Based on these features, the first automated guided vehicle 1 is possible with its electronic control device 6 to calculate the relative pose and/or position of the second automated guided vehicle 1a in reference to the first automated guided vehicle 1. The characteristic features are calculated for example from the geometric model of the second automated guided vehicle 1a. The model is e.g., saved in the electronic storage device 6 of the first automated guided vehicle 1.

Subsequently the first automated guided vehicle 1 drives, automatically controlled by its electronic control device 6 and preferably regulated, to a predefined docking pose and/or docking position in reference to the second automated guided vehicle 1a. For example, based on data of the sensors 8 of the first automated guided vehicle 1 and odometer data the first automated guided vehicle 1 can automatically monitor the relative pose and/or position in reference to the second automated guided vehicle 1a during its automatic motion. The automatic monitoring of the relative pose occurs for example based on a particle filter-based method known in principle to one trained in the art.

If the two automated guided vehicles 1, 1a have sufficiently approached, the bus systems 7 of both automated guided vehicles 1, 1a automatically connect via the transceivers embodied as photoelectric relays 9 to form a common bus system, by automatically generating the communication connection 11 between the two transceivers embodied as photoelectric relays 9. This way, a common drive control is possible via the first automated guided vehicle 1. Preferably, data from the sensors 8 of the second automated guided vehicle 1a, e.g., is distributed via the communication connection 11. This way the vehicle combination or the vehicle formation develops.

In case of the present exemplary embodiment, the mechanic coupling of both automated guided vehicles 1, 1a can also occur via the mechanic coupling devices 12. The mechanic coupling occurs preferably after the establishment of the communication connection 11 so that it is possible to command the mechanic coupling exclusively with the first automated guided vehicle 1. The mechanic coupling devices 12 may each show a drive which can be controlled via the respective bus system 7 by the respective electronic control device 6. The automated guided vehicles 1, 1a may also be moved jointly in a loose connection, i.e. without any mechanic coupling.

In case of the present exemplary embodiment the two automated guided vehicles 1, 1a each show a navigation functionality, which is based e.g., on a model of the respective automated guided vehicle 1, 1a. This model is saved e.g., in the respective electronic control device 6. The model comprises e.g., a statement regarding the contour, the rotational center, the kinetic-dynamic parameters (maximum speed, acceleration, etc.), the number, position, and connection data of the sensors 8 of the respective automated guided vehicle 1, 1a.

For a common drive control and general commanding of the first automated guided vehicle 1 it is preferably provided that the navigation functionality of the first automated guided vehicle 1 is automatically adjusted to the vehicle combination in order to illustrate in particular the configuration of the vehicle combination or vehicle formation, thus particularly its contour, rotational center, kinetic-dynamic parameters (maximum speed, acceleration, etc. of the vehicle combination), number, position, and connection data of the sensors 8.

An automatic dissolution of the vehicle combination may be provided as well. For this purpose, the following steps can be performed:

If the automated guided vehicles 1, 1a are mechanically coupled, here mechanical decoupling occurs. This is preferably controlled by the first automated guided vehicle 1. The coupling device 12 of both automated guided vehicles 1, 1a are preferably opened jointly.

Then the vehicle roles change: The role of both automated guided vehicles 1, 1a is set to individual vehicle, i.e. the first automated guided vehicle 1 only controls its own motion and the second automated guided vehicle 1a itself controls its own motion. The communication connection 12 is severed.

The configuration of the navigation functionality of the first automated guided vehicle 1 is reset to its original configuration.

Subsequently a controlled separation of the two automated guided vehicles 1, 1a can occur.

In case of the present exemplary embodiment the second automated guided vehicle 1a comes to rest before a communication connection 11 is established and the first automated guided vehicle 1 controls the second automated guided vehicle 1a after the communication connection 11 has been established. However, it is also possible that, after the establishment of the communication connection 11, the second automated guided vehicle 1a controls the motion of the first automated guided vehicle 1.

A fleet management may occur. The automated guided vehicles 1, 1a in the vehicle combination communicate their role and the identity to the other automated guided vehicles 1, 1a in the formation. A superimposed process control 10 can directly address and command the automated guided vehicle 1 controlling the vehicle combination based on this information. All automated guided vehicles 1, 1a in the vehicle combination can therefore be commanded as a single automated guided vehicle.

The vehicle combination may also show more than two automated guided vehicles 1, 1a. A vehicle combination with e.g., three automated guided vehicles may also be generated from a vehicle combination with two automated guided vehicle 1, 1a and another automated guided vehicle.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for forming and operating a vehicle combination, wherein the vehicle combination includes at least a first autonomous vehicle and a second autonomous vehicle, each of the first and second autonomous vehicles configured to automatically control its motion in a state wherein the first and second autonomous vehicles do not form the vehicle combination, the method comprising:
   automatically generating a communication connection between the first autonomous vehicle and the second autonomous vehicle; and
   automatically controlling a motion of the second autonomous vehicle by the first autonomous vehicle via the communication connection in order to form the vehicle combination from the first autonomous vehicle and the second autonomous vehicle;
   wherein each of the first and second autonomous vehicles comprises a separate bus system, wheels for moving the respective autonomous vehicle, drive devices for driving the respective wheels, sensors, and an electronic control device communicating with the sensors and the drive devices of the respective autonomous vehicle via the respective bus system, whereby, in the state in which the autonomous vehicles do not form the vehicle combination, the autonomous vehicles move by automatic control of the drive devices of the respective autonomous vehicles;
   automatically generating the communication connection between the first autonomous vehicle and the second autonomous vehicle comprises automatically generating the communication connection between the bus system of the first autonomous vehicle and the bus system of the second autonomous vehicle to form a common bus system; and
   automatically controlling the drive devices of the second autonomous vehicle using the electronic control device of the first autonomous vehicle via the common bus system in order to form the vehicle combination from the first autonomous vehicle and the second autonomous vehicle.

2. The method of claim 1, further comprising, before automatically generating a communication connection, at least one of:
   a) detecting with the first autonomous vehicle characteristic features of the second autonomous vehicle, determining a relative position and orientation between the first and second autonomous vehicles by the first autonomous vehicle, and
   automatically moving the first autonomous vehicle such that the first and second autonomous vehicles assume a predetermined position and orientation relative to each other; or
   b) detecting with the second autonomous vehicle characteristic features of the first autonomous vehicle, determining a relative position and orientation between the first and second autonomous vehicles by the second autonomous vehicle, and
   automatically moving the second autonomous vehicle such that the first and second autonomous vehicles assume a predetermined position and orientation relative to each other.

3. The method of claim 1, wherein automatically moving at least one of the first or second autonomous vehicles is controlled by its respective electronic control device.

4. The method of claim 1, wherein the first and second autonomous vehicles each comprise a mechanical coupling device, the method further comprising:
   automatically mechanically coupling the first and second autonomous vehicles via the mechanical coupling devices.

5. The method of claim 4, wherein automatically mechanically coupling the first and second autonomous vehicles is controlled by the electronic control device of the first autonomous vehicle via the common bus system.

6. The method claim 1, wherein the first and second autonomous vehicles each comprise a navigation functionality that includes information about the configuration of the respective autonomous vehicle and upon which the electronic control devices of the first and second automomous vehicles, in the state in which the autonomous vehicles do not form the vehicle combination, automatically move their respective autonomous vehicle, the method further comprising:
   automatically reconfiguring the navigation functionality of the first autonomous vehicle such that it comprises information about the configuration of the vehicle combination.

7. The method of claim 6, wherein the information about the configuration of the respective autonomous vehicle comprises a model of the respective autonomous vehicle and the information about the configuration of the vehicle combination comprises a model of the vehicle combination.

8. The method of claim 6, further comprising:
   separating the communication connection in order to dissolve the vehicle combination; and
   automatically resetting the configuration of the navigation functionality of the first autonomous vehicle.

9. A vehicle combination, comprising:
   a first autonomous vehicle;
   at least a second autonomous vehicle;
   a communication connection between the first autonomous vehicle and the second autonomous vehicle;
   each of the first and second autonomous vehicles configured, in a state in which the autonomous vehicles do not form the vehicle combination, to autonomously control their respective motions;
   the first autonomous vehicle automatically controlling via the communication connection the motion of the second autonomous vehicle to form the vehicle combination;
   wherein each of the first and second autonomous vehicles comprises a separate bus system, wheels for moving the respective autonomous vehicle, drive devices for driving the respective wheels, sensors, and an electronic control device communicating with the sensors and the drive devices of the respective autonomous vehicle via the bus system, whereby, in the state in which the autonomous vehicles do not form the vehicle combination, the autonomous vehicles move by automatic control of the drive devices of the respective autonomous vehicles;

wherein when the first and second autonomous vehicles form the vehicle combination, the respective bus systems form a common bus system via the communication connection; and wherein the electronic control device of the first autonomous vehicle directly controls the drive devices of the second autonomous vehicle via the common bus system in order to form the vehicle combination from the first autonomous vehicle and the second autonomous vehicle.

10. The vehicle combination of claim 9, wherein at least one of:
   a) the first autonomous vehicle detects characteristic features of the second autonomous vehicle in order to determine a relative position and orientation between the first and second autonomous vehicles, and
      the first autonomous vehicle automatically moves such that the two autonomous vehicles assume a predetermined position and orientation relative to each other; or
   b) the second autonomous vehicle detects characteristic features of the first autonomous vehicle in order to determine a relative position and orientation between the first and second autonomous vehicles, and
      the second autonomous vehicle automatically moves such that the two autonomous vehicles assume a predetermined position and orientation relative to each other.

11. The vehicle combination of claim 10, wherein the movement of at least one of the first or second autonomous vehicles is controlled by its respective electronic control device.

12. The vehicle combination of claim 9, wherein each of the first and second autonomous vehicles comprises a mechanical coupling device and the first autonomous vehicle mechanically couples the first and second autonomous vehicles using the mechanical coupling devices.

13. The vehicle combination of claim 12, wherein the first autonomous vehicle mechanically couples the autonomous vehicles under the control of the electronic control device of the first autonomous vehicle via the common bus system.

14. The vehicle combination of claim 9, wherein:
   each of the first and second autonomous vehicles further comprises a navigation functionality that includes information about the configuration of the respective autonomous vehicle and upon which the electronic control devices of the first and second autonomous vehicles, in the state in which the autonomous vehicles do not form the vehicle combination, automatically move their respective autonomous vehicle; and
   the first autonomous vehicle automatically reconfigures its navigation functionality such that it comprises information about the configuration of the vehicle combination.

15. The vehicle combination of claim 14, wherein the information about the configuration of the respective autonomous vehicle comprises a model of the respective autonomous vehicle, and the information about the configuration of the vehicle combination comprises a model of the vehicle combination.

16. The vehicle combination of claim 14, wherein the first autonomous vehicle severs the communication connection in order to dissolve the vehicle combination and automatically resets the configuration of the navigation functionality of the first autonomous vehicle.

* * * * *